United States Patent
Tsumeda et al.

(10) Patent No.: US 11,152,159 B2
(45) Date of Patent: *Oct. 19, 2021

(54) HYBRID CAPACITOR AND MANUFACTURING METHOD THEREOF

(71) Applicant: Nippon Chemi-Con Corporation, Tokyo (JP)

(72) Inventors: Satoru Tsumeda, Tokyo (JP); Kazuma Okura, Tokyo (JP); Kenji Tamamitsu, Tokyo (JP)

(73) Assignee: NIPPON CHEMI-CON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/310,428

(22) PCT Filed: Jun. 16, 2017

(86) PCT No.: PCT/JP2017/022319
§ 371 (c)(1),
(2) Date: Dec. 15, 2018

(87) PCT Pub. No.: WO2017/221830
PCT Pub. Date: Dec. 28, 2017

(65) Prior Publication Data
US 2019/0333708 A1    Oct. 31, 2019

(30) Foreign Application Priority Data
Jun. 22, 2016 (JP) .............................. JP2016-124014

(51) Int. Cl.
*H01G 11/06* (2013.01)
*H01G 11/50* (2013.01)
(Continued)

(52) U.S. Cl.
CPC ............. *H01G 11/06* (2013.01); *H01G 11/26* (2013.01); *H01G 11/46* (2013.01); *H01G 11/50* (2013.01);
(Continued)

(58) Field of Classification Search
CPC ........ H01G 11/06; H01G 11/26; H01G 11/46; H01G 11/50; H01G 11/60; H01G 11/62; H01G 11/86
See application file for complete search history.

(56) References Cited

U.S. PATENT DOCUMENTS 5,173,215 A * 12/1992 Clarke .................... C04B 35/46
423/608
2004/0202934 A1    10/2004 Zaghib et al.
(Continued)

FOREIGN PATENT DOCUMENTS

CN    100464463 C    2/2009
DE    10 2011 016 836 A1    10/2012
(Continued)

OTHER PUBLICATIONS

Pohjalainen et al., Comparative study of carbon free and carbon containing Li4Ti5O12 electrodes, Dec. 30, 2014, Journal of Power Sources 279; pp. 481-486 (Year: 2014).*
(Continued)

*Primary Examiner* — David M Sinclair
(74) *Attorney, Agent, or Firm* — SGPatents PLLC

(57) ABSTRACT

A hybrid capacitor with further increased energy density, and a manufacturing method thereof are provided. This hybrid capacitor is configured from a positive electrode which is a polarizable electrode that has double-layer capacitance, and a negative electrode which has a negative electrode active material which can occlude and release lithium ions and which is formed from metal compound
(Continued)

particles having a three-dimensional network structure, wherein, as an electrolyte, the electrolytic solution contains lithium salts in a molar concentration greater than or equal to 1.6 M.

10 Claims, 12 Drawing Sheets

(51) Int. Cl.
  *H01G 11/46* (2013.01)
  *H01G 11/60* (2013.01)
  *H01G 11/26* (2013.01)
  *H01G 11/62* (2013.01)
  *H01G 11/86* (2013.01)

(52) U.S. Cl.
  CPC ............ *H01G 11/60* (2013.01); *H01G 11/62* (2013.01); *H01G 11/86* (2013.01)

(56) References Cited

U.S. PATENT DOCUMENTS

| | | | |
|---|---|---|---|
| 2007/0009798 A1 | 1/2007 | Inagaki et al. | |
| 2008/0261113 A1* | 10/2008 | Huang | H01M 4/485 429/221 |
| 2009/0123848 A1* | 5/2009 | Matsui | H01M 10/0568 429/324 |
| 2010/0040950 A1* | 2/2010 | Buiel | H01G 11/38 429/211 |
| 2010/0099030 A1* | 4/2010 | Nishida | H01G 11/24 429/324 |
| 2011/0157771 A1* | 6/2011 | Gibson | H01G 9/02 361/500 |
| 2012/0009460 A1 | 1/2012 | Inagaki et al. | |
| 2012/0009477 A1* | 1/2012 | Chen | H01M 4/505 429/224 |
| 2013/0029228 A1 | 1/2013 | Inagaki et al. | |
| 2013/0149612 A1 | 6/2013 | Takemoto et al. | |
| 2014/0002960 A1 | 1/2014 | Tezuka et al. | |
| 2014/0328005 A1 | 11/2014 | Oh et al. | |
| 2016/0111228 A1 | 4/2016 | Okuno et al. | |
| 2016/0190574 A1* | 6/2016 | Nagai | C01G 23/005 429/231.1 |
| 2017/0365852 A1* | 12/2017 | Araki | H01M 10/052 |
| 2018/0037467 A1* | 2/2018 | Miyoshi | H01G 11/06 |
| 2019/0131079 A1* | 5/2019 | Tsumeda | H01G 11/06 |

FOREIGN PATENT DOCUMENTS

| | | | |
|---|---|---|---|
| JP | 2010228980 A | * | 10/2010 |
| JP | 2010-280560 A | | 12/2010 |
| JP | 2012-048963 A | | 3/2012 |
| JP | 2012-169217 A | | 9/2012 |
| JP | 2012-204748 A | | 10/2012 |
| JP | 2014-086164 A | | 5/2014 |
| JP | 2014-203606 A | | 10/2014 |
| KR | 10-2014-0131119 | | 11/2014 |
| TW | 201302617 A1 | | 1/2013 |
| WO | WO 2012/169331 A1 | | 12/2012 |
| WO | WO 2014/148250 A1 | | 9/2014 |
| WO | WO 2015/025763 A1 | | 2/2015 |

OTHER PUBLICATIONS

International Search Report from International Patent Application No. PCT/JP2017/022319, dated Sep. 12, 2017.
Smith, J.R., et al., "Electrodes based on Magnéli phase titanium oxides: the properties and applications of Ebonex® materials", Journal of Applied Electrochemistry, vol. 28, No. 10), Oct. 1, 1998, pp. 1021-1033.
Partial Supplementary European Search Report dated Feb. 4, 2020, in European Patent Application No. 17815298.9.
Office Action dated Mar. 16, 2020, in Chinese Patent Application No. 201780037912.8.
Office Action dated Jan. 24, 2021, in Korean Patent Application No. 10-2018-7032278.
Office Action dated Dec. 23, 2020, in Chinese Patent Application No. 201780037912.8.

* cited by examiner

HYBRID CAPACITOR AND MANUFACTURING METHOD THEREOF

TECHNICAL FIELD

The present disclosure relates to a hybrid capacitor including a negative electrode that can occlude and release lithium ions and a positive electrode having an electrical double-layer capacitance.

BACKGROUND ART

In an electrical double-layer capacitor including a positive electrode and a negative electrode which mainly contain activated carbon, charging and discharging are performed when cations and anions in an electrolytic solution are absorbed into and desorbed from activated carbon. While an electrical double-layer capacitor has advantages that rapid charging and discharging are possible, output characteristics are excellent, and charging and discharging cycle characteristics are excellent, it has a problem of a low energy density. On the other hand, in a lithium secondary battery in which a material that can occlude and release lithium ions is used as a positive electrode active material and a negative electrode active material, lithium ions are released from a positive electrode according to charging and discharging, and are occluded in a negative electrode, and lithium ions are released from a negative electrode according to discharging, and are occluded in a positive electrode. While a lithium ion secondary battery has advantages that it can operate at a higher voltage and it has a larger energy density, compared to an electrical double-layer capacitor, it has problems that rapid charging and discharging are difficult and the reliability of a charging and discharging cycle is low.

Thus, a so-called hybrid capacitor that has advantages of both has been proposed. The hybrid capacitor includes a polarizable electrode having an electrical double-layer capacitance as a positive electrode and metal compound particles that can occlude and release lithium ions as a negative electrode, and combines advantages of an electrical double-layer capacitor and a lithium ion secondary battery. That is, this hybrid capacitor has a high energy density and excellent input and output characteristics.

However, it has been pointed out that some metal compound particles, such as lithium titanate, which can occlude and release lithium ions have low electrical conductivity. As a solution to this low electrical conductivity, many studies have been conducted to combine carbon with high electrical conductivity as a conductive additive with metal compound particles (for example, refer to Patent Document 1).

CITATION LIST

Patent Literature

Patent Document 1: JP 2012-169217 A

SUMMARY OF INVENTION

Technical Problem

However, when a complex of metal compound particles that can occlude and release lithium ions and carbon is used for a negative electrode, a high energy density which is an advantage of a hybrid capacitor is reduced. Therefore, to further increase an energy density which is an advantage of a hybrid capacitor, it is desirable to reduce an amount of carbon to be combined.

The present disclosure has been proposed in order to solve the above problems. An objective of the present disclosure is to provide a hybrid capacitor in which an energy density is further increased and a manufacturing method thereof.

Solution to Problem

The inventors found that, when metal compound particles having a three-dimensional network structure are used as a negative electrode active material that can occlude and release lithium ions, electrical conductivity is favorable, a conductive additive is not necessary or can be included in a very small amount, and an energy density is not reduced, and they are suitable for a negative electrode of a hybrid capacitor.

On the other hand, for a hybrid capacitor, regarding severe capacity deterioration when charging and discharging are repeated, extensive studies have been conducted to improve cycle characteristics. As a result of extensive studies, it has been found that, when a metal compound having a three-dimensional network structure is used as a negative electrode active material, by applying a lithium salt with a molar concentration of 1.6 M or more as an electrolyte, cycle characteristics of the hybrid capacitor are improved.

Although not limited to this speculated mechanism, due to the size of the surface area of the three-dimensional network structure, gas is likely to be generated in an electrode reaction which adsorbs and desorbs lithium ions, and cause deterioration in the electrode, and cycling, but it is assumed that a lithium salt with a molar concentration of 1.6 M or more provides sufficient lithium ions necessary for an electrode reaction, such that generation of gas from the negative electrode active material is inhibited.

Thus, the hybrid capacitor according to the present disclosure includes a positive electrode including a polarizable electrode having an electrical double-layer capacitance and a negative electrode having a negative electrode active material including metal compound particles which can occlude and release lithium ions and having a three-dimensional network structure in which primary particles are bonded to each other with voids therebetween. The electrolytic solution includes a lithium salt with a molar concentration of 1.6 M or more as an electrolyte.

The electrolytic solution may include a mixed solution containing a cyclic carbonate ester and a chain carbonate ester as a solvent. When an electrolyte of a lithium salt with a molar concentration of 1.6 M or more is incorporated thereto, not only the cycle characteristics are improved, but also an increase in a direct current internal resistance is reduced and a discharging rate characteristic also becomes excellent. A discharging rate characteristic is a ratio of a capacity with a large discharging current to a capacity with a small discharging current value, and it becomes better as a high rate capacity retention rate becomes higher. The electrolytic solution may further include an ammonium salt as an electrolyte.

The cyclic carbonate ester may be propylene carbonate or ethylene carbonate, and the chain carbonate ester may be at least one type selected from the group consisting of ethyl methyl carbonate, dimethyl carbonate, and diethyl carbonate. In particular, when the cyclic carbonate ester is propylene carbonate or ethylene carbonate, and the chain carbonate ester is a mixture of ethyl methyl carbonate and dimethyl carbonate, an effect of reducing a direct current internal resistance is significant and a discharging rate characteristic also becomes excellent.

In the mixed solution, mixing proportions of the cyclic carbonate ester and the chain carbonate ester may be the same amounts in a volume ratio. In addition, the chain carbonate ester is a mixed solution of a plurality of types selected from the group consisting of ethyl methyl carbonate, dimethyl carbonate, and diethyl carbonate, and mixing proportions in the mixed solution may be the same amounts in a volume ratio.

The metal compound particles may include less than 5 weight % of residual carbon with respect to the metal compound particles. The metal compound particles may be lithium titanate. In addition, in a differential pore volume converted from a pore distribution obtained by analyzing the metal compound particles using a nitrogen gas adsorption measurement method, a differential pore volume in a pore size range of 10 to 40 nm may have a value of 0.01 $cm^3/g$ or more.

The metal compound particles may have a three-dimensional network structure in which crystallites of lithium titanate are connected to each other, and a Magneli phase may be formed on a part of the surfaces of the crystallites. When a Magneli phase is included in connected crystallites of lithium titanate, that is, a Magneli phase is included in a part of an electron path formed by the three-dimensional network structure, higher electrical conductivity is imparted to metal compound particles, and carbon that reduces an advantage of an energy density is not necessary or can be included in a very small amount.

In addition, a method for manufacturing a hybrid capacitor according to the present disclosure includes a first process in which a precursor of metal compound particles and a carbon source are combined to obtain a first composite material; a second process in which the first composite material is heated under a non-oxidizing atmosphere to generate metal compound particles, and the metal compound particles and carbon are combined to obtain a second composite material; a third process in which the second composite material is heated under an oxygen atmosphere to obtain metal compound particles from which carbon is removed; a fourth process of preparing a negative electrode using the metal compound particles from which carbon is removed obtained in the third process as a negative electrode active material; and a fifth process of forming an element impregnated with an electrolytic solution in which a positive electrode and the negative electrode obtained in the fourth process face each other with a separator therebetween, wherein, in the fifth process, an electrolyte including a lithium salt with a molar concentration of 1.6 M or more is added to the electrolytic solution.

Advantageous Effects of Invention

According to the present disclosure, it is possible to further increase an energy density of a hybrid capacitor while reducing cycle deterioration.

Figure 1:
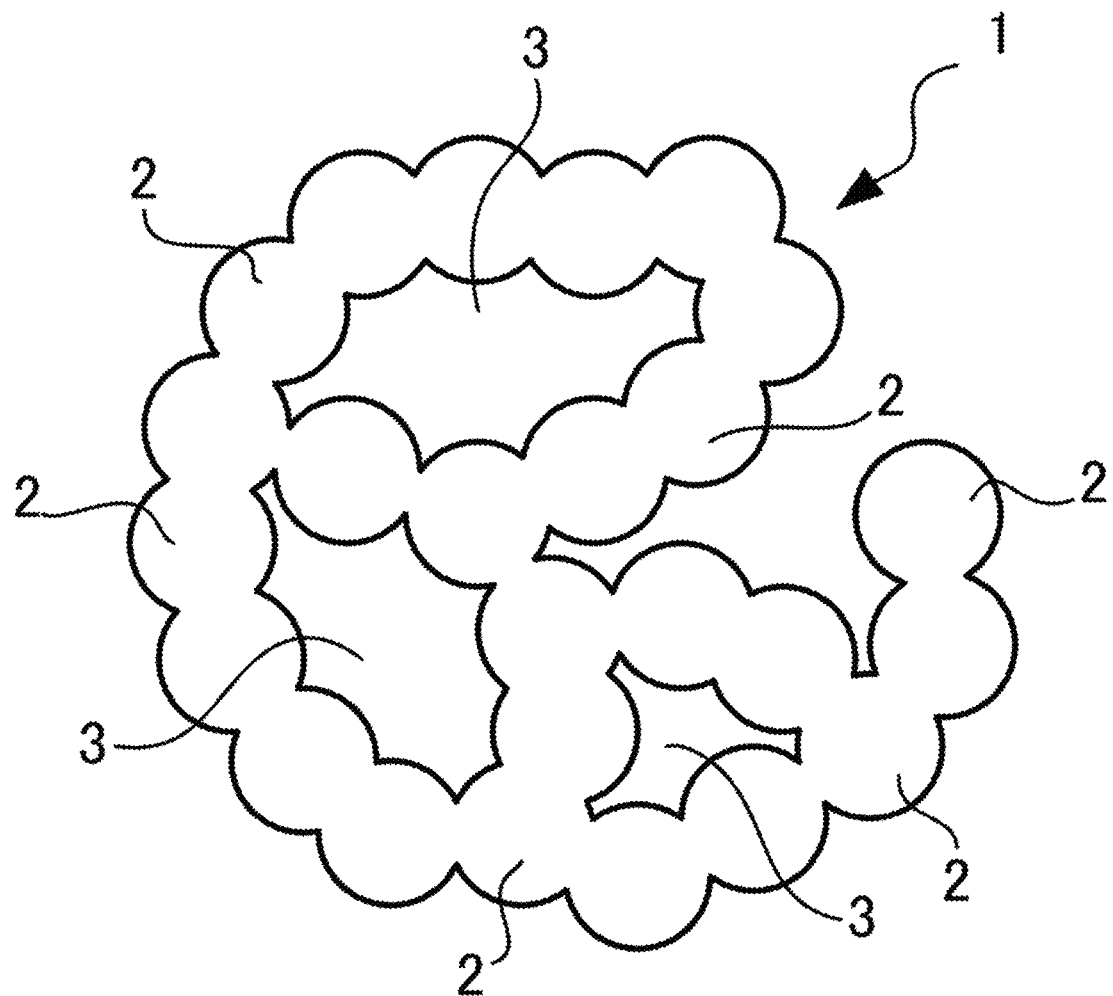
FIG. 1 is a conceptual diagram showing an example of a negative electrode active material of a hybrid capacitor according to the present embodiment.

DESCRIPTION OF EMBODIMENTS (1. Configuration)
(1-1. Hybrid Capacitor)

Embodiments of the present disclosure will be described below. In a hybrid capacitor, a positive electrode is a polarizable electrode having an electrical double-layer capacitance, and a negative electrode is a Faraday reaction electrode that can occlude and release lithium ions. The positive electrode and the negative electrode face each other with a separator therebetween. The positive electrode, the negative electrode, and the separator constitute a capacitor element. An electrolytic solution is impregnated into the capacitor element.

The positive electrode is formed by supporting a positive electrode active material on a current collector. The negative electrode is formed by supporting a negative electrode active material on a current collector. The positive electrode active material is molded and bonded to the current collector. The negative electrode active material is molded and bonded to the current collector. The positive electrode active material and the current collector, and the negative electrode active material and the current collector are bonded respectively via a binder using pressure bonding, a doctor blade method, or the like.

The current collector is, typically, a conductive material such as aluminum, copper, iron, nickel, titanium, steel, and carbon. In particular, aluminum or copper having high thermal conductivity and electron conductivity is preferable. As the shape of the current collector, any shape such as a film shape, a foil shape, a plate shape, a net shape, an expanded metal shape, or a cylindrical shape can be used.

Examples of the binder include rubbers such as a fluorine type rubber, a diene type rubber, and a styrene type rubber, a fluorine-containing polymer such as polytetrafluoroethylene and polyvinylidene fluoride, celluloses such as carboxymethyl cellulose, and nitrocellulose, and additionally, a polyolefin resin, a polyimide resin, an acrylic resin, a nitrile resin, a polyester resin, a phenol resin, a polyvinyl acetate resin, a polyvinyl alcohol resin, and an epoxy resin. These binders may be used alone, or a mixture of two or more thereof may be used.

(1-2. Positive Electrode)

The positive electrode active material mainly includes a carbon material, and the carbon material has a porous structure or a fibrous structure and has an electrical double-layer capacitance. The carbon material may be subjected to an opening treatment or an activation treatment. An appropriate amount of a conductive additive may be mixed into a layer of the positive electrode active material as necessary. The carbon material as the positive electrode active material is a single material selected from among the following materials or a mixture of a plurality of types thereof.

First, typical examples of the positive electrode active material having a porous structure include natural plant tissues such as coconut shell, synthetic resins such as phenol resins, activated carbon made from a source material derived from fossil fuels such as coal, coke, and pitch, carbon black such as Ketchen black (hereinafter referred to as KB), acetylene black, and Channel Black, carbon nanohorn, amorphous carbon, natural graphite, artificial graphite, graphitized Ketchen black, and mesoporous carbon. Typical examples of the positive electrode active material having a fibrous structure include carbon nanotubes and carbon nanofibers.

(1-3. Negative Electrode)

The negative electrode active material is metal compound particles that can occlude and release lithium ions. As shown in FIG. 1, the negative electrode active material has a three-dimensional network structure 1. In the three-dimensional network structure 1, nanosized primary particles 2 are connected to each other and continuous in a mesh form, and nanosized voids 3 exist. There is no grain boundary at a binding interface of the primary particles 2, and on the other hand, there are many fine pores between the primary particles 2. In the negative electrode active material, the three-dimensional network structure 1 forms an electron path of the negative electrode active material, the voids 3 become a storage space of an electrolytic solution, and pores between the primary particles 2 are considered to become a path of ions.

Examples of metal compound particles used as the negative electrode active material include oxides such as FeO, $Fe_2O_3$, $Fe_3O_4$, MnO, $MnO_2$, $Mn_2O_3$, $Mn_3O_4$, COO, $CO_3O_4$, NiO, $Ni_2O_3$, TiO, $TiO_2$, $TiO_2(B)$, CuO, NiO, SnO, $SnO_2$, $SiO_2$, $RuO_2$, WO, $WO_2$, $WO_3$, $MoO_3$, and ZnO, metals such as Sn, Si, Al, and Zn, composite oxides such as $LiVO_2$, $Li_3VO_4$, $Li_4Ti_5O_{12}$, $Sc_2TiO_5$, and $Fe_2TiO_5$, nitrides such as $Li_{2.6}Co_{0.4}N$, $Ge_3N_4$, $Zn_3N_2$, and $Cu_3N$, $Y_2Ti_2O_5S_2$, and $MoS_2$. Among these, lithium titanate ($Li_4Ti_5O_{12}$) is preferable.

The porosity in a cross section of the three-dimensional network structure is preferably in a range of 7 to 50%. When the porosity is less than 7%, an area in contact with an electrolytic solution is small, which influences the movement of ions in an electrolytic solution. In addition, when the porosity exceeds 50%, bonds between primary particles become sparse, and it is difficult to form a three-dimensional network structure.

An average particle size of primary particles is in a range of 5 to 300 nm. A method of calculating an average particle size is as follows. That is, the primary particles 2 are observed using a scanning electron microscope, an image including at least 150 primary particles or more is captured, a major diameter and a short diameter of an elliptical image of the primary particles 2 included in the captured single field of view (image) are measured, an average value of the major diameter and the minor diameter is calculated for each of the primary particles 2, average values of the primary particles 2 are summed, and the sum value is divided by the number of measured primary particles 2. The result falls within a range of 5 to 300 nm.

When primary particles in this range are bonded to form a three-dimensional network structure, metal compound particles acquire many nanosized pores, an area of metal compound particles in contact with an electrolytic solution increases, and the movement of ions in an electrolytic solution becomes smooth. In addition, when pores of the metal compound particles are measured, there are many fine pores. In particular, many fine pores of 40 nm or less are included.

In a differential pore volume converted from a pore distribution obtained by analyzing metal compound particles having a three-dimensional network structure using a nitrogen gas adsorption measurement method, a differential pore volume in a pore size range of 10 to 40 nm has a value of 0.01 $cm^3/g$ or more and particularly has a value of 0.02 $cm^3/g$ or more, and an area in contact with the electrolytic solution is high. When an area in contact with the electrolytic solution is larger, a discharging rate characteristic when used for a negative electrode is improved.

In metal compound particles having this three-dimensional network structure, according to a manufacturing method to be described below, adhered carbon remains. An amount of adhered carbon is preferably less than 5 weight % with respect to the metal compound particles. Within this range, a decrease in the energy density due to the presence of carbon can be reduced. In particular, an amount of adhered carbon is preferably less than 1 weight % with respect to the metal compound particles. When an amount of carbon is limited to a very small amount, a reaction between carbon and an electrolytic solution in the negative electrode is restricted and storage characteristics are improved.

Figure 2:
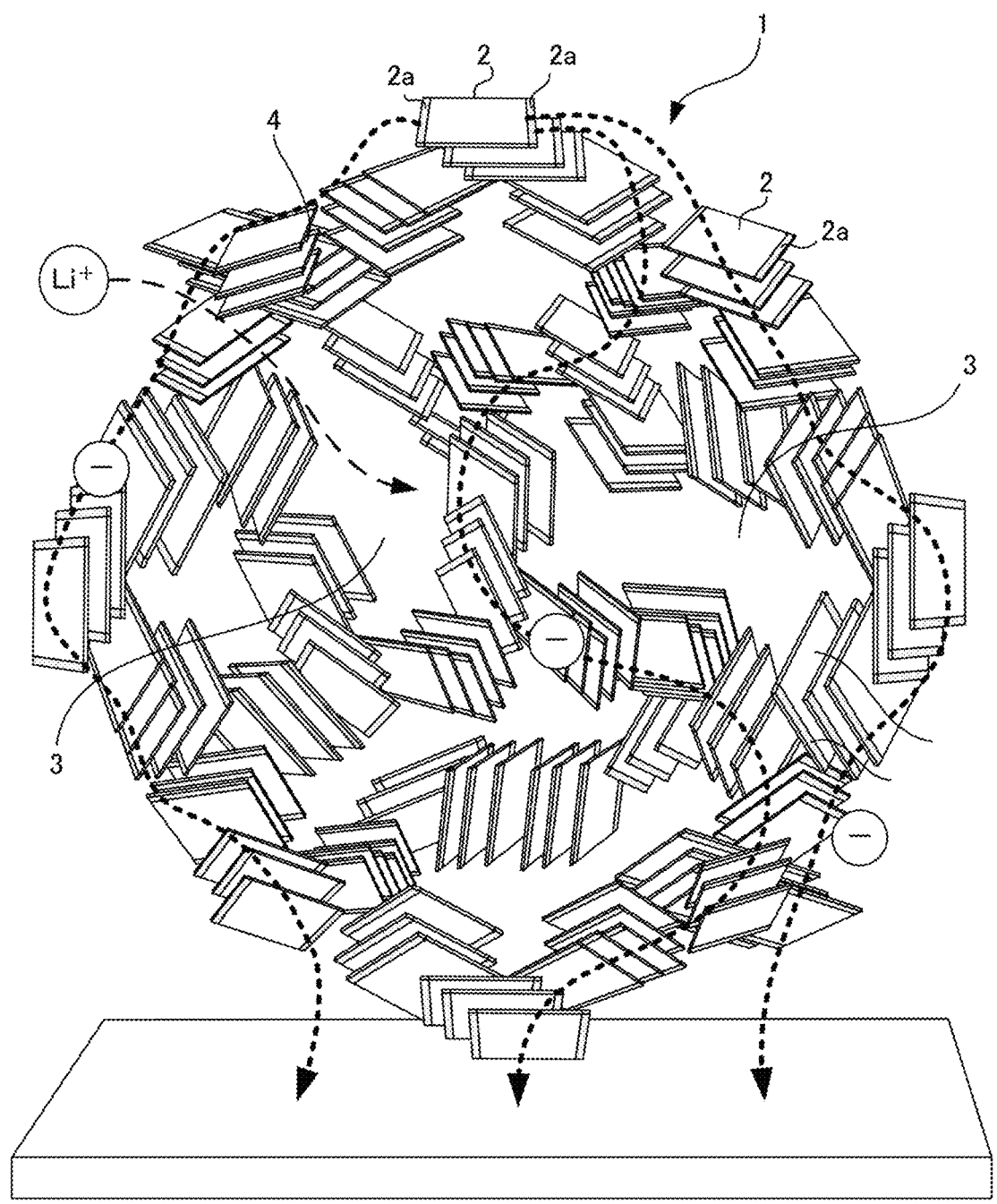
FIG. 2 is a conceptual diagram showing another example of the negative electrode active material of the hybrid capacitor according to the present embodiment.

Here, when metal compound particles serving as a negative electrode active material are lithium titanate, as shown in FIG. 2, the primary particles 2 of the metal compound particles are more preferably crystallites of which a part of the surface has a Magneli phase 2a. A crystallite is the largest aggregation that can be regarded as a single crystal of a metal compound. Crystallites are randomly oriented and bonded to each other on surfaces such as a flat surface and an end surface, and have pores 4 in some places. When a crystallite has a flat plate shape, a three-dimensional network structure is a card house structure. When a crystallite is a flat plate or a polyhedron, the surface of the crystallite is an edge surface and an edge or an end of a faceted surface. In addition, when a crystallite has a shape formed as a curved surface, the surface of the crystallite is a single or a plurality of partial regions thereof.

The crystallite has a flat plate shape such as a triangle, a rectangle or other polygonal shapes, a polyhedron shape with a thickness, or a shape formed in a sphere, an ellipsoid, or other curved surface. As metal compound particles constituting a three-dimensional network structure by crystallites having a Magneli phase, a spinel type lithium titanate represented by $Li_{4+w}Ti_5O_{12}$ ($0 \le w \le 3$) or a Ramsdellite type lithium titanate represented by $Li_{2+y}Ti_3O_7$ ($0 \le y \le 3$) can be used.

A Magneli phase is generated when one or more of edges or ends of crystallites are altered or when a part of the full length of edges or ends of crystallites or the full length thereof is altered. A Magneli phase may be included not only in edges or ends, but also in a partial region on the center part of the faceted surface. A Magneli phase may be a titanium oxide represented by a general formula $Ti_nO_{2n-1}$ ($3 \leq n \leq 10$). The Magneli phase 2a is, for example, $Ti_4O_7$, a mixed phase of $Ti_4O_7$ and $Ti_5O_9$, or any single substance selected from among compounds represented by a general formula $Ti_nO_{2n-1}$ ($3 \leq n \leq 10$) or a mixed phase of two or more thereof.

The negative electrode active material formed of lithium titanate has both characteristics of lithium titanate and characteristics of a Magneli phase. Lithium titanate has an energy storage function according to insertion and release of lithium ions. Since a change in the volume due to this insertion and release is about 1%, capacity deterioration is low. Since a charging and discharging potential is about 1.55 V (vs. Li/Li$^+$), side reactions such as decomposition of an electrolytic solution and precipitation of the metal lithium due to rapid charging and discharging are unlikely to occur, and cycle characteristics are excellent. The Magneli phase has high electrical conductivity, and $Ti_4O_7$ has an electrical conductivity of about 2.75 times that of carbon. That is, the negative electrode active material has a characteristic that high electrical conductivity is additionally imparted by a Magneli phase while the performance of the active material as lithium titanate is maintained.

In addition, the negative electrode active material has a three-dimensional network structure in which a Magneli phase with high electrical conductivity is present on the surface of crystallites, and the crystallites are connected on surfaces such as a flat surface and an end surface. Therefore, the crystallites are partially connected via Magneli phases. Connection forms include a case in which Magneli phases are connected to each other, a case in which a Magneli phase and a surface other than a Magneli phase are connected to each other, and a combination of thereof. Accordingly, in the negative electrode active material, an electron path including a Magneli phase is formed, and the entire negative electrode active material also has high electrical conductivity.

(1-4. Separator)

As the separator serving as a base material, celluloses such as Kraft cellulose, Manila hemp, esparto, hemp, and rayon and mixed paper thereof, a polyester resin such as polyethylene terephthalate, polybutylene terephthalate, polyethylene naphthalate, and derivatives thereof, a polytetrafluoroethylene resin, a polyvinylidene fluoride resin, a vinylon resin, and a polyamide resin such as aliphatic polyamides, semi-aromatic polyamides, and wholly aromatic polyamides, and resins such as a polyimide resin, a polyethylene resin, a polypropylene resin, a trimethylpentene resin, a polyphenylene sulfide resin, and an acrylic resin can be used alone, or a mixture thereof can be used.

(1-5. Electrolytic Solution)

The electrolyte of the electrolytic solution is a lithium salt serving as a lithium ion source. Examples of the lithium salt include $LiPF_6$, $LiBF_4$, $LiClO_4$, $LiN(SO_2CF_3)_2$, $LiN(SO_2C_2F_5)_2$, $CF_3SO_3Li$, $LiC(SO_2CF_3)_3$, and $LiPF_3(C_2F_5)_3$, and a mixture thereof. A molar concentration of the lithium salt is 1.6 M or more in the electrolytic solution. The molar concentration (mol/L) is the number of moles of the lithium salt with respect to 1 L of a solvent. When a lithium salt with a molar concentration of 1.6 M or more is added, capacity deterioration according to a charging and discharging cycle of a hybrid capacitor and an increase in the direct current resistance according to a charging and discharging cycle are reduced.

As an electrolyte, a quaternary ammonium salt may be added in addition to the lithium salt. While the lithium salt has a molar concentration of 1.6 M or more, a molar concentration of the quaternary ammonium salt is not particularly limited, and, for example, a quaternary ammonium salt with a molar concentration of 1 M may be added. As the quaternary ammonium salt, tetraethylammonium, triethylmethylammonium, diethyldimethylammonium, ethyltrimethylammonium, methyl ethyl pyrrolidinium, spirobipyrrolidinium, spiro-(N,N')-bipyrrolidinium, 1-ethyl-3-methylimidazolium, 1-ethyl-2,3-dimethylimidazolium, and the like may be exemplified as cations, and $BF_4^-$, $PF_6^-$, $ClO_4^-$, $AsF_6^-$, $SbF_6^-$, $AlCl_4^-$, and $RfSO_3^-$, $(RfSO_2)_2N^-$, $RfCO_2^-$ (Rf is a fluoroalkyl group having 1 to 8 carbon atoms), and the like may be exemplified as anions.

As the solvent of the electrolytic solution, the following solvents may be used. Here, these solvents may be used alone or a mixture of two or more thereof may be used. For example, a cyclic carbonate ester, a chain carbonate ester, a phosphate ester, a cyclic ether, a chain ether, a lactone compound, a chain ester, a nitrile compound, an amide compound, a sulfone compound, and the like may be exemplified. Examples of the cyclic carbonate ester include ethylene carbonate, propylene carbonate, butylene carbonate, 4-fluoro-1,3-dioxolan-2-one, and 4-(trifluoromethyl)-1,3-dioxolan-2-one. Ethylene carbonate and propylene carbonate are preferable.

Examples of the chain carbonate ester include dimethyl carbonate, ethyl methyl carbonate, diethyl carbonate, methyl n-propyl carbonate, methyl isopropyl carbonate, n-butyl methyl carbonate, diethyl carbonate, ethyl n-propyl carbonate, ethyl isopropyl carbonate, n-butyl ethyl carbonate, di-n-propyl carbonate, diisopropyl carbonate, di-n-butyl carbonate, fluoroethyl methyl carbonate, difluoroethyl methyl carbonate, and trifluoroethyl methyl carbonate. Dimethyl carbonate, ethyl methyl carbonate, and diethyl carbonate are preferable.

Examples of the phosphate ester include trimethyl phosphate, triethyl phosphate, ethyl dimethyl phosphate, and diethyl methyl phosphate. Examples of the cyclic ether include tetrahydrofuran, and 2-methyltetrahydrofuran. Examples of the chain ether include dimethoxyethane. Examples of the lactone compound include γ-valerolactone, and γ-butyrolactone. Examples of the chain ester include methyl propionate, methyl acetate, ethyl acetate, and methyl formate. Examples of the nitrile compound include acetonitrile. Examples of the amide compound include dimethylformamide. Examples of the sulfone compound include sulfolane, methyl sulfolane, dimethyl sulfone, ethyl methyl sulfone, and isopropyl sulfone, but the present disclosure is not limited thereto.

In particular, when a cyclic carbonate ester is used as a solvent, a solution mixed with a chain carbonate ester is desirable. The chain carbonate ester added to the cyclic carbonate ester may be a single type or a mixture of a plurality of types thereof. A mixing ratio is not limited, but volume proportions of the cyclic carbonate ester and the chain carbonate ester may be equal to each other, and in a cyclic carbonate ester formed of a mixture of a plurality of types, amounts thereof may be the same. When a mixed solution containing a cyclic carbonate ester and a chain carbonate ester is used as a solvent of an electrolytic solution, if a lithium salt with a molar concentration of 1.6 M or more is used as an electrolyte, cycle characteristics of a hybrid capacitor are improved, an effect of reducing a direct current internal resistance, namely DCIR is obtained, and an excellent discharging rate characteristic is exhibited. The discharging rate characteristic is a ratio of a capacity with a large discharging current to a capacity for a small discharging current value, and it becomes better as a high rate capacity retention rate becomes higher.

In addition, when a chain carbonate ester obtained by mixing ethyl methyl carbonate and dimethyl carbonate is added to a cyclic carbonate ester to prepare a solvent, if a lithium salt with a molar concentration of 1.6 M or more is used as an electrolyte, this is particularly desirable because an effect of reducing a direct current internal resistance and an excellent discharging rate characteristic is obtained approximating to a case in which a lithium salt with a molar concentration of 1.2M is used as an electrolyte.

(2. Actions and Effects)

In the negative electrode active material having a three-dimensional network structure, since primary particles are connected in a mesh form and form an electron path, and voids serve as a storage space of lithium ions, the resistance of particles decreases. In other words, the responsiveness of occluding and releasing of lithium ions is improved. Therefore, when a negative electrode active material having a three-dimensional network structure is applied to a hybrid capacitor, the hybrid capacitor has an excellent discharging rate characteristic. That is, a decrease in the internal resistance is implied, and a conductive additive such as carbon is not necessary or can be included in a very small amount, and a decrease in the energy density due to the conductive additive can be prevented.

In addition, when a lithium salt with a molar concentration of 1.6 M or more is added to an electrolytic solution, cycle characteristics of a hybrid capacitor having a negative electrode active material having a three-dimensional network structure are greatly improved. In the negative electrode active material having a three-dimensional network structure, due to the size of its surface area, a gas is easily generated during an electrode reaction in which lithium ions are absorbed and desorbed, and this gas deteriorates the electrode and causes cycle deterioration. Since a lithium salt with a molar concentration of 1.6 M or more provides sufficient lithium ions necessary for an electrode reaction, it is assumed that gas generation from the negative electrode active material is reduced.

In addition, the inventors conducted extensive studies and as a result, found that, when a solvent of an electrolytic solution is a mixture of a cyclic carbonate ester and a chain carbonate ester, a hybrid capacitor in which a lithium salt with a molar concentration of 1.6 M or more is used as a solvent of the electrolytic solution can obtain an effect of reducing a direct current internal resistance, and exhibits an excellent discharging rate characteristic.

Therefore, in this hybrid capacitor, the negative electrode is composed of metal compound particles that can occlude and release lithium ions and have a three-dimensional network structure, and the electrolytic solution includes a lithium salt with a molar concentration of 1.6 M or more as an electrolyte. Therefore, the hybrid capacitor exhibits a favorable energy density and an excellent discharging rate characteristic with improved cycle characteristics.

In addition, in this hybrid capacitor, the negative electrode is composed of metal compound particles that can occlude and release lithium ions and have a three-dimensional network structure, the electrolytic solution includes a lithium salt with a molar concentration of 1.6 M or more as an electrolyte, and a mixed solution containing a cyclic carbonate ester and a chain carbonate ester is contained as the solvent. Therefore, this hybrid capacitor has improved cycle characteristics and has an effect of reducing a direct current internal resistance and exhibits an excellent discharging rate characteristic.

In addition, the negative electrode active material has a three-dimensional network structure in which crystallites of lithium titanate are connected to each other, and a Magneli phase is formed on a part of the surfaces of the crystallites. When a highly conductive Magneli phase forms a part of an electron path, the conductivity of the negative electrode active material is further improved, and additionally, an excellent discharging rate characteristic is exhibited, and also a conductive additive is not necessary or included in a very small amount.

(3. Manufacturing Method of Negative Electrode Active Material)

(3-1. Overview)

A method of manufacturing a negative electrode active material having a three-dimensional network structure will be described. The method of manufacturing a negative electrode active material is not limited to the following method, but it can be manufactured through the following three processes. That is, the first process is a process in which a precursor of metal compound particles and a carbon source are combined to obtain a first composite material. The second process is a process in which the first composite material is heated under a non-oxidizing atmosphere to generate metal compound particles, and the metal compound particles are combined with carbon to obtain a second composite material. The third process is a process in which the second composite material is heated under an oxygen atmosphere to remove carbon and metal compound particles are obtained.

(3-2. First Process)

A precursor of metal compound particles and a carbon source are combined to obtain a first composite material. The precursor of the metal compound particles refers to a material before metal compound particles are generated according to a heat treatment process. For example, a metal compound containing any one or more of Mn, Co, Ni, V, Fe, Ti, Sn, Si, Ru, W, Zn, Al, Ge, Cu, Mo, Zn, Sc, Y, S and N may be used. A precursor containing a lithium source added to this constituent compound is used.

A material source of metal compound particles may be a powder or may be dissolved in a solution. In the case of lithium titanate, for example, a titanium source such as titanium alkoxide and titanium oxide, or a lithium source such as lithium acetate, lithium nitrate, lithium carbonate, and lithium hydroxide may be used as a material source, and a precursor of metal compound particles is generated.

The carbon source is carbon itself or a material that can be converted into carbon according to a heat treatment. Carbon itself is, for example, a powder, and any type can be used without particular limitation as long as it is a carbon material having conductivity. For example, carbon black such as Ketchen black, acetylene black, and Channel Black, fullerene, carbon nanotubes, carbon nanofibers, amorphous carbon, carbon fibers, natural graphite, artificial graphite, graphitized Ketchen black, mesoporous carbon, vapor-grown carbon fibers, and the like may be exemplified. Among these, a carbon material having a nano particle size is preferable.

A material that can be converted into carbon according to a heat treatment is an organic substance which is deposited on the surface of the precursor of metal compound particles and is converted into carbon in a later heat treatment process. Examples of the organic substance include polyhydric alcohol (ethylene glycol, etc), polymers (polyvinyl alcohol, polyethylene glycol, polyvinylpyrrolidone, etc), sugars (glucose, etc.), and amino acids (glutamic acid, etc.)

Examples of a method of combining a material source of metal compound particles with a carbon source include a mechanochemical treatment, a spray drying treatment, and a stirring treatment. In any method of combination, at least one type of material source of metal compound particles and a carbon source are added to a solvent, and the material source is dissolved in the solvent to obtain a solution. As the solvent, water, methanol, ethanol, or isopropyl alcohol can be suitably used. A mixture of two or more types of solvent may be used. If a precursor reaction of metal compound particles is a hydrolysis reaction, a material source thereof may be a metal alkoxide M(OR)x.

In the mechanochemical treatment, shear stress and a centrifugal force are applied to the solution and the precursor of metal compound particles are bonded to the surface of carbon powder. In this treatment, shear stress and a centrifugal force are applied to the solution in a reaction chamber that turns. As the reaction chamber, a reaction chamber which is composed of concentric cylinders including an outer cylinder and an inner cylinder and in which a through-hole is provided on a side surface of the turnable inner cylinder, and a sheathing board is disposed on an opening of the outer cylinder is suitably used. In the reaction chamber, a distance between the outer wall surface of the inner cylinder and the inner wall surface of the outer cylinder is preferably 5 mm or less and more preferably 2.5 mm or less. Here, a centrifugal force necessary for forming on the thin film is 1,500 N (kgms$^{-2}$) or more and preferably 70,000 N or more (kgms$^{-2}$).

In the spray drying treatment, a carbon powder is dispersed in the solvent, and a material source of metal compound particles may then be dispersed. As a dispersion method, a carbon powder may be highly dispersed in the solvent using an ultracentrifugation treatment (a treatment in which shear stress and a centrifugal force are applied to a powder in the solution), a bead mill, a homogenizer, or the like. The spray drying treatment is performed at a pressure of about 0.1 Mpa and a temperature at which carbon powder does not burn. According to the spray drying treatment, a precursor of metal compound particles having an average particle size of primary particles in a range of 5 to 300 nm is obtained.

In the stirring treatment, a powder serving as a material source is preferably nano-level microparticles that have previously been pulverized. When a polymer is used as a material that can be converted into carbon according to a heat treatment, a material source of metal compound particles is added to a solvent to which a polymer is added in advance, and this solution may be stirred. When the weight of the powder serving as a material source of metal compound particles is set as 1, the polymer weight may be adjusted to be within a range of 0.05 to 5. In addition, when an average secondary particle size of microparticles is set to 500 nm or less, and preferably, 100 nm or less, it is possible to obtain metal compound particles having a small particle size. Here, in the stirring treatment, since the polymer can efficiently cover the surface of the material source of metal compound particles, excess growth of metal compound particles in the following second process is suppressed and nanosized microparticles are easily generated.

(3-3. Second Process)

In the process of obtaining a second composite material, the first composite material is heated under a non-oxidizing atmosphere to generate metal compound particles, and a second composite material in which the metal compound particles and carbon are combined is obtained. The non-oxidizing atmosphere is set to prevent burning of the carbon source, and examples of the non-oxidizing atmosphere include an inert atmosphere and a saturated steam atmosphere. Typically, the non-oxidizing atmosphere is a vacuum, or a nitrogen or argon atmosphere.

According to this heat treatment, while the precursor of metal compound particles grows, and is combined with a carbon source, metal compound particles are generated. When a material that can be converted into carbon according to a heat treatment is used as a carbon source, according to a heat treatment under a non-oxidizing atmosphere, the material is carbonized on the surface of the precursor of metal compound particles, carbon is generated, and a second composite material in which the carbon is combined with metal compound particles that grow according to a heat treatment is generated.

In addition, since a heat treatment is performed under a non-oxidizing atmosphere, the carbon source is unlikely to burn, and exists in a state in which it is combined with metal compound particles, and a second composite material in which metal compound particles and carbon are combined is obtained. The second composite material is considered as a composite material in which metal compound particles (for example, lithium titanate: LTO) are supported on carbon (for example, carbon nanofibers: CNF) and LTO is dispersed as nanosized particles on CNF.

When a heat treatment is performed under an inert atmosphere, in order to prevent burning of the carbon source, a temperature thereof is maintained in a range of 600 to 950° C. for 1 minute to 20 minutes. Within this range, favorable metal compound particles are obtained and a favorable capacity and rate characteristics are obtained. In particular, when metal compound particles are lithium titanate, if a heat treatment temperature is lower than 600° C., this is not preferable because insufficient lithium titanate is generated, and when a heat treatment temperature exceeds 950° C., this is not preferable because lithium titanate aggregates and lithium titanate itself decomposes. Under a nitrogen atmosphere, nitrogen is doped into metal compound particles, and the conductivity of metal compound particles increases. Here, when the following preheat treatment is not performed, the temperature may be maintained in the same temperature range for 3 to 7 hours.

In addition, when a heat treatment is performed under a saturated steam atmosphere as a heat treatment under a non-oxidizing atmosphere, in order to prevent burning of the carbon source, a temperature thereof is maintained in a range of 110 to 300° C. for 1 to 8 hours.

Here, before the process of obtaining a second composite material, the first composite material may be subjected to a preheat treatment in a temperature range of 200 to 500° C. for 1 to 300 minutes. This preheat treatment is desirably performed under a non-oxidizing atmosphere, but it may be performed under an oxygen atmosphere when the temperature is lower than 300° C. at which the carbon source does not burn. According to metal compound particles obtained by this preheat treatment, it is possible to remove impurities present in the first composite material, and a state in which the precursor of metal compound particles is uniformly attached to the carbon source can be obtained. In addition, an effect of promoting generation of the precursor of metal compound particles included in the first composite material is obtained.

(3-4. Third Process)

In the process of obtaining metal compound particles, the second composite material is heated under an oxygen atmosphere, carbon is burned, and voids are generated in carbon portions. In addition, according to this heat treatment, metal compound particles react with and bond to each other. Accordingly, carbon-derived voids and bonds between metal compound particles are combined and metal compound particles have a three-dimensional network structure.

In order to remove carbon and bond metal compound particles to each other, a heat treatment temperature is preferably maintained in a range of 350 or higher and 800° C. or lower, preferably 400 or higher and 600° C. or lower for 1 to 24 hours. In particular, under an inert atmosphere, a temperature is preferably set to be lower than the heat treatment temperature in the process of obtaining a second composite material. At a temperature of lower than 350° C., carbon contained in the second composite material is insufficiently removed, and at a temperature of higher than 800° C., aggregation of primary particles proceeds and there are fewer voids. In addition, in a temperature range of 400 or higher and 600° C. or lower, an average particle size of primary particles is maintained at 5 to 300 nm, and particle growth from the average particle size of primary particles of the metal compound particles before the heat treatment is suppressed.

In addition, the heat treatment temperature is preferably equal to or higher than a temperature of a preheating process. As the oxygen atmosphere, an atmosphere mixed with nitrogen or the like may be used, and an atmosphere containing 15% or more oxygen, such as in the atmosphere, is preferable. In the heat treatment under an oxygen atmosphere, since an amount of oxygen decreases due to loss of carbon, oxygen may be appropriately supplied into a heat treatment furnace.

Thus, it is thought that the negative electrode active material having a three-dimensional network structure is generated when carbon in a complex is burned and crystallites are sintered. When metal compound particles are lithium titanate, furthermore, it is thought that, according to a heat treatment of a complex under an oxygen atmosphere, the surface of crystallites of lithium titanate is transformed to a Magneli phase. Therefore, a combining ratio based on masses of carbon and crystallites, an oxygen concentration, a burning temperature and a burning time may determine the size of lithium titanate particles, a degree of carbon removal, the presence or absence of transformation to a Magneli phase and a transformation proportion. For example, at a temperature of 300° C. or higher and lower than 400° C., transformation to a Magneli phase is unlikely to proceed, and the presence or absence and a proportion of a Magneli phase can be controlled by adjusting the temperature.

EXAMPLES

The present invention will be described below in further detail with reference to examples. Here, the present invention is not limited to the following examples.

(4. Example 1)

(4-1. Negative electrode active material) The following three processes were performed and a negative electrode active material having a three-dimensional network structure was generated. First, 20 g of carbon nanofibers and 245 g of tetraisopropoxy titanium were added to 1, 300 g of isopropyl alcohol. A weight ratio between titanium alkoxide and carbon nanofibers was selected so that a weight ratio between lithium titanate and carbon nanofibers after the first process was about 8:2.

The obtained liquid was introduced into an inner cylinder of a reaction chamber which was composed of concentric cylinders including an outer cylinder and an inner cylinder and in which a through-hole was provided on a side surface of the inner cylinder, and a sheathing board was disposed on an opening of the outer cylinder. The inner cylinder was turned for 300 seconds so that a centrifugal force of 35,000 $kgms^{-2}$ was applied to the liquid, and carbon nanofibers were highly dispersed in the liquid.

In addition, 165 g of acetic acid and 50 g of lithium acetate were dissolved in a mixed solvent containing 145 g of isopropyl alcohol and 150 g of water. The obtained liquid was introduced into the inner cylinder of the reaction chamber to prepare a solution. The inner cylinder was turned for 300 seconds so that a centrifugal force of 35,000 $kgms^{-2}$ was applied to this solution, a thin film of the solution was formed on the inner wall of the outer cylinder, and shear stress and a centrifugal force were applied to the solution.

Subsequently, the content in the reaction chamber was collected, the solvent was evaporated in air, and additionally dried at 100° C. for 17 hours. The resultant product obtained by drying was subjected to a preheat treatment in a nitrogen atmosphere at 400° C. for 30 minutes, and a heat treatment was then performed in a nitrogen atmosphere at 900° C. for 3 minutes. In addition, 100 g of the resultant product obtained according to a heat treatment in a nitrogen atmosphere was subjected to a heat treatment in an oxygen atmosphere at 500° C. for 6 hours, and a final resultant product as a negative electrode active material having a three-dimensional network structure was obtained.

(4-2. Hybrid Capacitor)

Activated carbon, carbon black, and an acrylic binder were mixed at a weight ratio of 10:1:1, and an appropriate amount of N-methyl pyrrolidone was additionally mixed with the mixture to obtain a slurry. The obtained slurry was applied to a current collector which was made of aluminum and had a conductive adhesive layer containing graphite, a positive electrode active material layer with a predetermined thickness was formed, and a positive electrode was produced. Similarly, the obtained negative electrode active material having a three-dimensional network structure and polyvinylidene fluoride were mixed at a weight ratio of 10:1, and an appropriate amount of N-methyl pyrrolidone was additionally mixed with the mixture to obtain a slurry. The obtained slurry containing the negative electrode active material having a three-dimensional network structure was applied to a current collector made of aluminum, a negative electrode active material layer with a predetermined thickness was formed, and a negative electrode was produced. Then, a capacitor element in which a positive electrode and a negative electrode facing each other with a rayon separator therebetween was formed.

For an electrolytic solution, 2 mol of $LiBF_4$ as an electrolyte was added to 1 L of a propylene carbonate (PC) solvent, and 1 mol of methyl ethyl pyrrolidinium ($MEPyBF_4$) as an electrolyte was added, and a 2 M-$LiBF_4$+1 M-$MEPyBF_4$/PC electrolytic solution was prepared. This electrolytic solution was impregnated into a capacitor element, lamination and sealing were performed, a hybrid capacitor cell was produced, and an aging treatment was performed.

(4-3. Comparative Example 1)

A negative electrode active material was different from that of Example 1. A negative electrode active material 2a in Comparative Example 1 was lithium titanate particles generated without using carbon. That is, 87 g of titanium oxide ($TiO_2$) pulverized to a nano size (about 200 nm) was added to an aqueous solution containing 38 g of lithium hydroxide and 800 g of water, and the mixture was stirred to obtain a solution. This solution was introduced into a spray drying device, and spray drying was performed to obtain a dried product. The obtained dried granulated product was heated in air at a temperature of 700° C. for 3 hours, and lithium titanate particles were obtained.

In the lithium titanate particles, no carbon was contained during a manufacturing process. Therefore, there were no voids from which carbon was removed, and no three-dimensional network structure was provided. The other components of a hybrid capacitor such as current collectors of a positive electrode and a negative electrode, a separator, and an electrolytic solution were the same as those of Example 1.

(4-4. Examples 2 to 7 and Comparative Example 2)

Hybrid capacitors in which a molar concentration of a lithium salt and a solvent contained in an electrolytic solution were changed from those of Example 1, and which had a negative electrode active material having a three-dimensional network structure were used as Examples 2 to 7 and Comparative Example 2. Differences between Examples 1 to 7 and Comparative Example 2 are summarized in the following Table 1. In Table 1, a molar concentration of a lithium salt is a molar concentration of $LiBF_4$. PC is propylene carbonate, EC is ethylene carbonate, DEC is diethyl carbonate, EMC is ethyl methyl carbonate, and DMC is dimethyl carbonate. The ratio in parentheses is a volume ratio. The sign+indicates addition.

TABLE 1

| Examples | Negative electrode active material structure | Molar concentration of lithium salt | Solvent of electrolytic solution |
|---|---|---|---|
| Example 1 | Three-dimensional network structure | 2.0M | PC |
| Example 2 | Three-dimensional network structure | 1.8M | PC |
| Example 3 | Three-dimensional network structure | 1.6M | PC |
| Comparative Example 2 | Three-dimensional network structure | 1.2M | PC |
| Example 4 | Three-dimensional network structure | 2.0M | EC + DEC (1:1, vol) |
| Example 5 | Three-dimensional network structure | 2.0M | PC + EMC + DMC (2:1:1, vol) |
| Example 6 | Three-dimensional network structure | 2.0M | EC + EMC (1:1, vol) |
| Example 7 | Three-dimensional network structure | 2.0M | EC + EMC + DMC (2:1:1, vol) |

(5. Confirmation of Negative Electrode Active Material)

Figure 3:
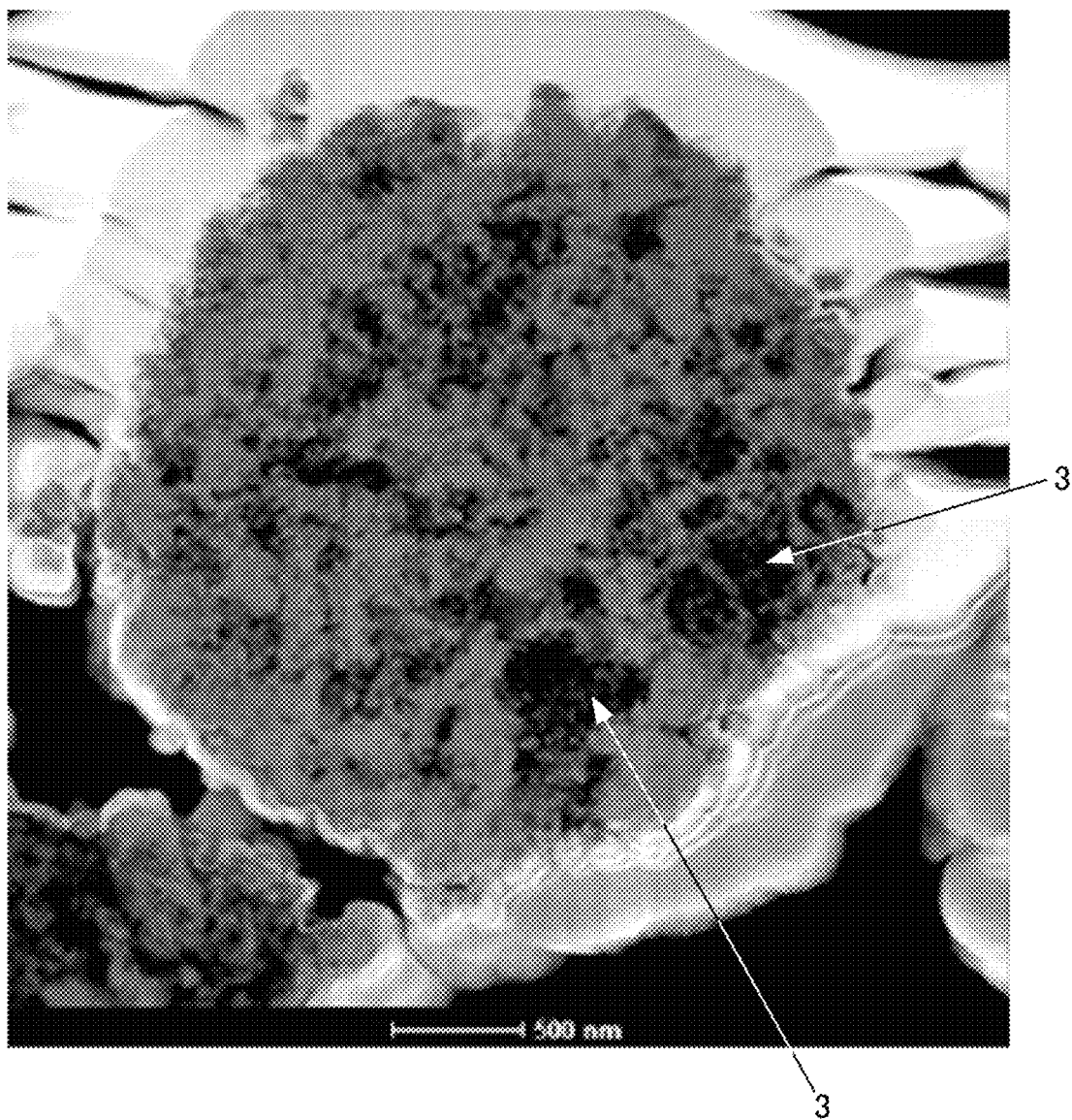
FIG. 3 is a TEM image obtained by capturing a cross section of a negative electrode active material of Example 1 with a magnification of 10,000.
Figure 4:
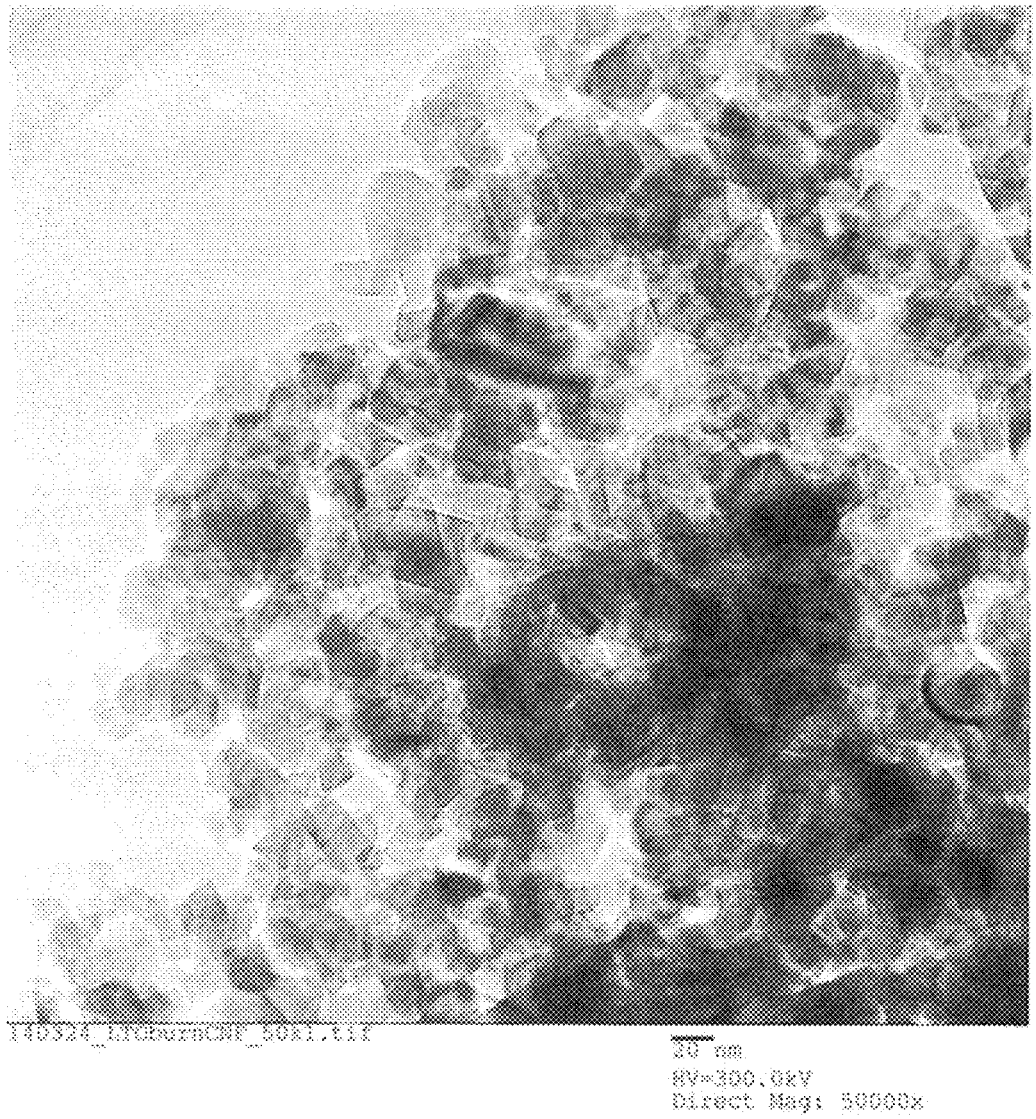
FIG. 4 is an HRTEM image with a focus on a crystallite part of the negative electrode active material of Example 1 with a magnification of 100,000.
Figure 5:
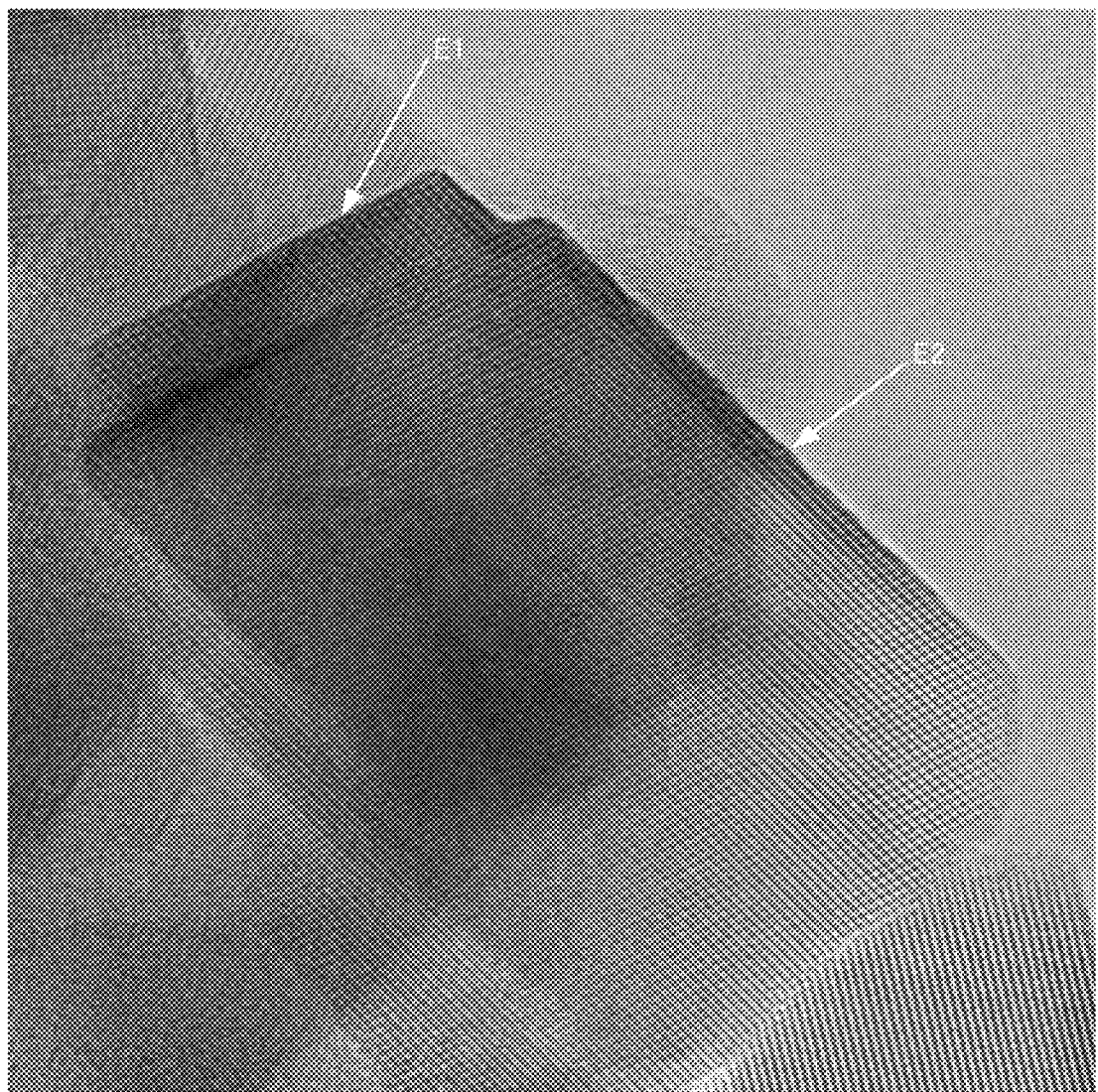
FIG. 5 is an HRTEM image with a focus on a crystallite part of the negative electrode active material of Example 1 with a magnification of 400,000.

Regarding the negative electrode active material obtained in Example 1, structural analysis of the final resultant product was performed. First, the entire particle image of the final resultant product and crystallites was captured using a scanning electron microscope, and a particle structure was analyzed. FIG. 3 is a TEM image obtained by capturing a cross section of the final resultant product with a magnification of 10,000. FIG. 4 is an HRTEM image with a focus on a crystallite part of the final resultant product using a high resolution transmission electron microscope with a magnification of 100,000. FIG. 5 is an HRTEM image with a focus on a crystallite part of the final resultant product using a high resolution transmission electron microscope with a magnification of 400,000.

As shown in FIG. 3, it can be understood that the final resultant product had a size of about 1.7 μm and had a three-dimensional network structure as a whole, and had many voids 3. In addition, as shown in FIG. 4, it can be understood that primary particles had a flake shape and primary particles were bonded to each other on flat surfaces or end surfaces. In addition, as shown in FIG. 5, it can be understood that edges E1 and E2 on two sides with respect to the flat surface of the crystallite were dark as a whole and the flat surface and the edge of the crystallite were crystals with different materials.

Figure 6:
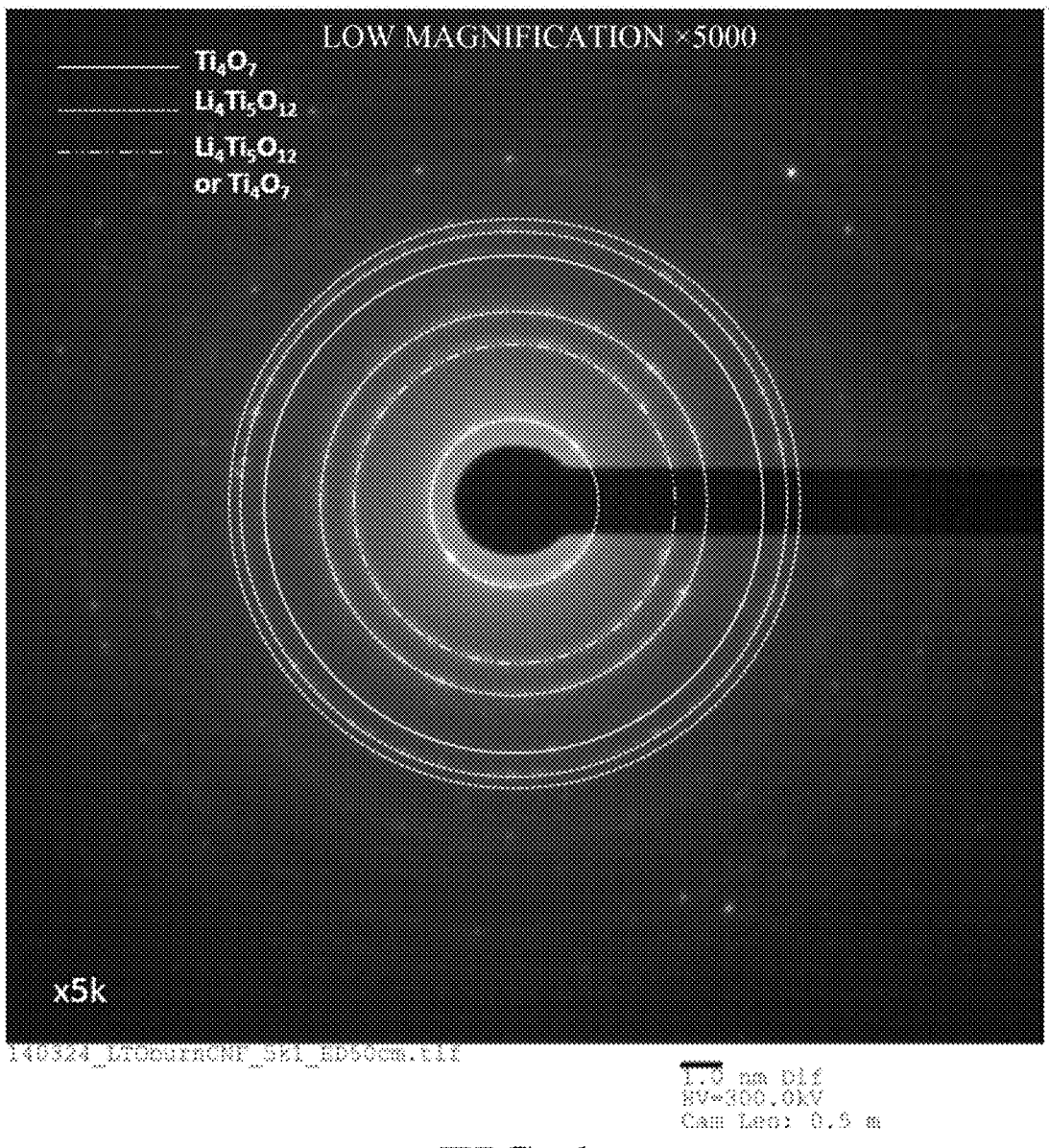
FIG. 6 is a restricted field of view ED diagram of the negative electrode active material of Example 1 with a magnification of 5,000.
Figure 7:
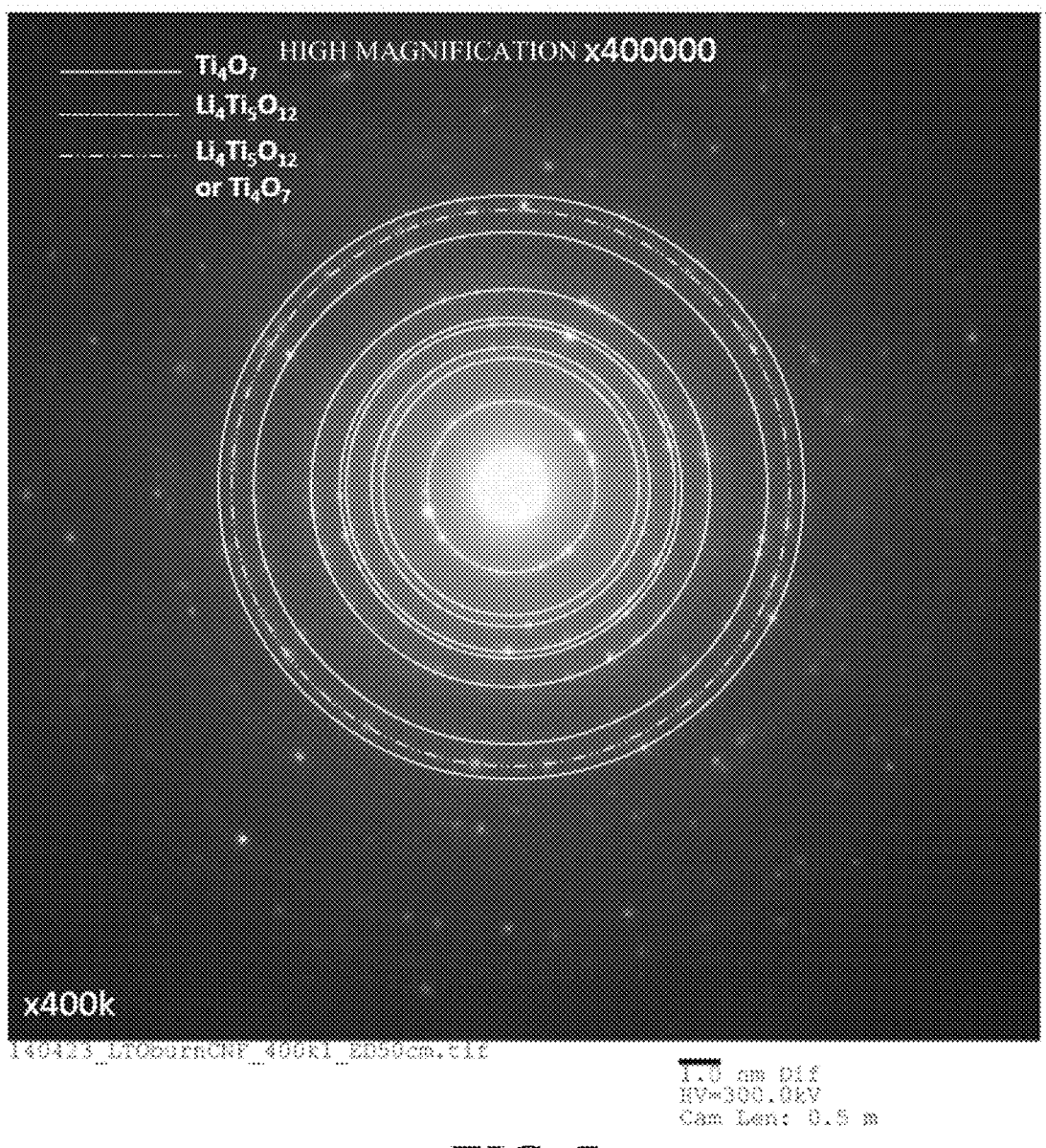
FIG. 7 is a restricted field of view ED diagram of the negative electrode active material of Example 1 with a magnification of 400,000.

In order to identify materials of the flat surface and the edge of the crystallite, the final resultant product was checked by a restricted field of view electron diffraction method. FIG. 6 is a restricted field of view ED diagram of the low magnification final resultant product with a low magnification of 5,000. FIG. 7 is a restricted field of view ED diagram of the high magnification final resultant product with a high magnification of 400,000. According to an actual measurement value based on a diffraction pattern with a low magnification of 5,000 shown in FIG. 6 and a result obtained by converting the actual measurement value into a interplanar distance d value (Å), and an actual measurement value based on a diffraction pattern with a high magnification of 400,000 shown in FIG. 7 and a result obtained by converting the actual measurement value into an interplanar distance d value (Å), it can be understood that, while most of the crystallites were composed of lithium titanate, a large amount of $Ti_4O_7$ was contained when observing with a high magnification.

As described above, it was confirmed that metal compound particles of the final resultant product as a whole had a card house structure in which crystallites of $Li_4Ti_5O_{12}$ were stacked, and were lithium titanate particles having a three-dimensional network structure in which the edge surface of the crystallites of $Li_4Ti_5O_{12}$ was transformed into $Ti_4O_7$.

Figure 8:
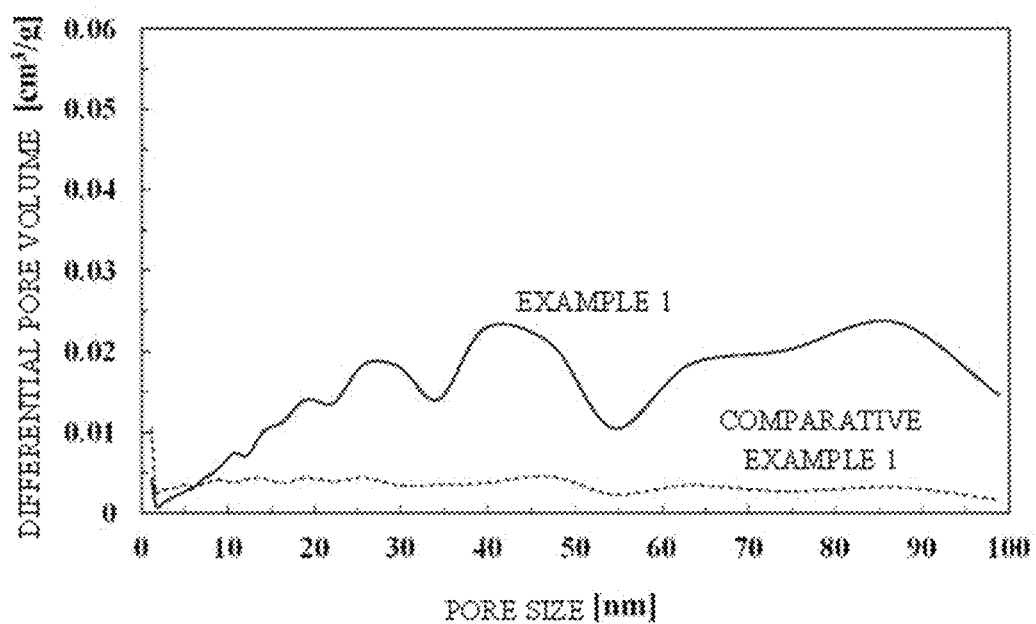
FIG. 8 is a diagram showing a differential pore volume of the negative electrode active material of Example 1.

Next, the pore distribution of the obtained lithium titanate particles of Example 1 and Comparative Example 1 was measured. As a measurement method, a nitrogen gas adsorption measurement method was used. Specifically, nitrogen gas was introduced to surfaces of metal oxide particles and into pores formed in the interior communicating with the surfaces of metal oxide particles, and an adsorption amount of nitrogen gas was obtained. Subsequently, a pressure of nitrogen gas introduced was gradually increased, an adsorption amount of nitrogen gas with respect to each equilibrium pressure was plotted, and an adsorption isothermal curve was obtained. In this example, a precision gas/vapor adsorption measurement instrument BELSORP-max-N(commercially available from Bel Japan Inc) was used for measurement. FIG. 8 is a differential pore volume distribution with a horizontal axis that represents a pore size and a vertical axis that represents an increment of a pore volume between measurement points.

As can be seen from FIG. 8, it can be understood that lithium titanate particles of Example 1 had a larger differential pore volume than lithium titanate particles of Comparative Example 1. It can be understood that, since a differential pore volume in such a range (100 nm) with a small pore size was large, an electrolytic solution entered the inside of lithium titanate particles, and an area of lithium titanate particles in contact with the electrolytic solution was large. In particular, a differential pore volume in a pore size range of 10 to 40 nm had a value of 0.01 $cm^3$/g or more and additionally, a value of 0.02 $cm^3$/g or more was obtained. Incidentally, when the diameter of the voids 3 in the TEM image in FIG. 3 was measured, the maximum diameter was about 500 nm. That is, it was confirmed that voids 3 having a maximum diameter of about 500 nm and also fine voids indicated by a differential pore volume were included.

In addition, an amount of the residual carbon in lithium titanate particles having a three-dimensional network structure was checked. In order to confirm the residual amount of carbon, negative electrode active materials of Example 1-1 and Example 1-2 were obtained by changing a heat treatment temperature and a heat treatment time in the third process for manufacturing metal compound particles having a three-dimensional network structure.

Example 1-1

In Example 1, 100 g of the resultant product obtained by performing a heat treatment in a nitrogen atmosphere was heated at 500° C. for 6 hours in an oxygen atmosphere. On the other hand, in Example 1-1, a negative electrode active material was obtained in the same manner as in Example 1 except that 100 g of the resultant product obtained by performing a heat treatment in a nitrogen atmosphere was heated at 350° C. for 3 hours.

Example 1-2

In Example 1, 100 g of the resultant product obtained by performing a heat treatment in a nitrogen atmosphere was heated at 500° C. for 6 hours in an oxygen atmosphere. On the other hand, in Example 1-2, a negative electrode active material was obtained in the same manner as in Example 1 except that 100 g of the resultant product obtained by performing a heat treatment in a nitrogen atmosphere was heated at 300° C. for 1 hour.

Using the negative electrode active materials of Example 1-1 and Example 1-2, a hybrid capacitor was produced using the same conditions and the same method as in Example 1. The residual amounts of carbon of the obtained negative electrode active materials of Example 1, Example 1-1 and Example 1-2 were confirmed by TG-DTA measurement (differential thermal-thermogravimetric simultaneous measurement). Here, a hybrid capacitor having a utilization ratio of 40% was used as a target for measuring the residual amount of carbon. Then, a storage test at 60° C. was performed for such examples. For storage test conditions, hybrid capacitors charged at 2.8 V were left for 30 minute, and were then left in an atmosphere at 60° C. for 1,500 hours. The discharging capacity when the capacitor was charged and discharged again was calculated as a fraction of the discharging capacity before the test. The results are shown in Table 2.

TABLE 2

| | Residual amount of carbon | Storage test |
| --- | --- | --- |
| Example 1 | 1% or less | 83% |
| Example 1-1 | 3% | 72% |
| Example 1-2 | 5% | 66% |

As shown in Table 2, when carbon in metal compound particles was burned and a three-dimensional network structure was created, carbon may remain in metal compound particles. In Example 1, 1 weight % or less of carbon remained. As shown in Table 1, the residual amount of carbon was preferably less than 5 weight %, and particularly, a favorable result was obtained in Example 1 in which the residual amount of carbon was 1 weight % or less.

(6. Evaluation of Negative Electrode Active Material Having Three-Dimensional Network Structure)
(6-1. Discharging Rate Characteristic)

Figure 9:
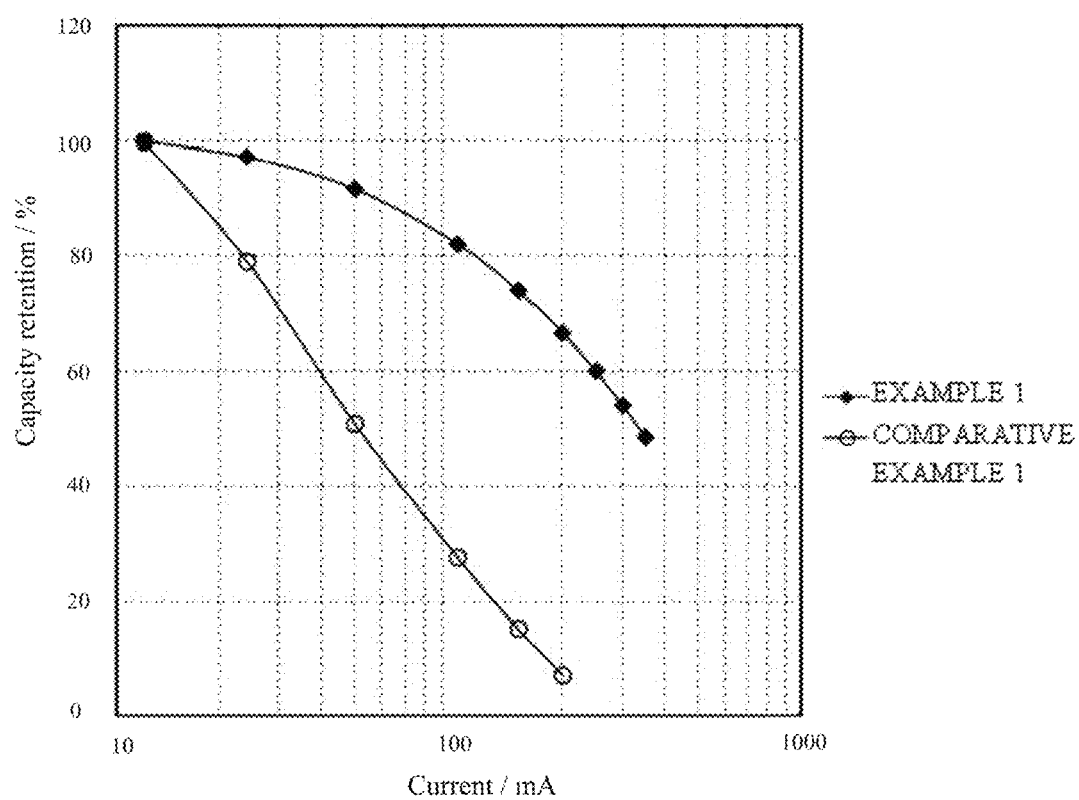
FIG. 9 is a graph showing discharging rate characteristics of hybrid capacitors of Example 1 and Comparative Example 1.

Using Example 1 and Comparative Example 1, discharging rate characteristics of hybrid capacitors in which a negative electrode active material having a three-dimensional network structure was used for a negative electrode were measured. FIG. 9 is a graph showing discharging rate characteristics of the hybrid capacitors of Example 1 and Comparative Example 1. The horizontal axis represents a current and the vertical axis represents a percentage of a capacity with respect to each discharging current if a capacity when a hybrid capacitor was discharged at a discharging current of 12 mA was set as 100%.

As shown in FIG. 9, it can be understood that the hybrid capacitor of Example 1 maintained an excellent capacity retention rate even when a discharging current was increased with respect to Comparative Example 1. This implies that the hybrid capacitor of Example 1 had a low direct current internal resistance. That is, it was confirmed that the negative electrode active material having a three-dimensional network structure had high conductivity. Therefore, in metal compound particles having a three-dimensional network structure, carbon is not necessary or can be included in a very small amount, and the energy density of the hybrid capacitor can be improved.

(7. Evaluation of Molar Concentration of Electrolyte)
(7-1. Cycle Characteristics)

Using Examples 1 to 3 and Comparative Example 2, a test for cycle characteristics was performed when a molar concentration of a lithium salt added to an electrolytic solution as an electrolyte was changed. In this test, at room temperature, charging and discharging were repeated in a voltage range of not less than 2.8 V to not more than 1.4 V and at a current of 8.3 A, and the number of cycles at which the deterioration of the electrostatic capacity reached 20% was observed. Test results of cycle characteristics are shown in the following Table 3.

TABLE 3

| Examples | Negative electrode active material structure | Molar concentration of lithium salt | Solvent of electrolytic solution | Number of cycles |
| --- | --- | --- | --- | --- |
| Example 1 | Three-dimensional network structure | 2.0M | PC | More than 30,000 cycles |
| Example 2 | Three-dimensional network structure | 1.8M | PC | More than 30,000 cycles |
| Example 3 | Three-dimensional network structure | 1.6M | PC | 20,000 cycles |
| Comparative Example 2 | Three-dimensional network structure | 1.2M | PC | 15,000 cycles |

($\Delta$cap 20%)

As shown in Table 3, in the hybrid capacitor of Comparative Example 2, the deterioration of the electrostatic capacity reached 20% after 15,000 charging and discharging cycles. However, in the hybrid capacitor of Example 3, 20,000 charging and discharging cycles were required until the deterioration of the electrostatic capacity reached 20%. In addition, in the hybrid capacitors of Examples 1 and 2, the deterioration of the electrostatic capacity did not reach 20% even after 30,000 charging and discharging cycles. That is, it was confirmed that, when the negative electrode active material of the hybrid capacitor was metal compound particles having a three-dimensional network structure, if a molar concentration of a lithium salt contained in the electrolytic solution was 1.6 M or more, cycle characteristics were improved.

(8. Evaluation of Solvent)

Using Examples 1 and 4 to 7 and Comparative Example 2, a direct current internal resistance corresponding to the electrolytic solution was checked. In this test, at room temperature, a charging and discharging cycle in which charging was performed at a current of 12 mA until 2.8 V was reached, the voltage was maintained at 2.8 V for 30 minutes, and discharging was performed at a current of 12 mA until 1.5 V was reached was performed twice. A DCIR was calculated from the voltage drop when 1 second had elapsed from when discharging started in the second discharging. The results of checking the direct current internal resistance are shown in the following Table 4.

TABLE 4

| Example | Negative electrode active material structure | Molar concentration of lithium salt | Solvent of electrolytic solution | Resistance ($\Omega$) |
|---|---|---|---|---|
| Example 1 | Three-dimensional network structure | 2.0M | PC | 1.5 |
| Comparative Example 2 | Three-dimensional network structure | 1.2M | PC | 1.0 |
| Example 4 | Three-dimensional network structure | 2.0M | EC + DEC (1:1, vol) | 1.3 |
| Example 5 | Three-dimensional network structure | 2.0M | PC + EMC + DMC (2:1:1, vol) | 1.3 |
| Example 6 | Three-dimensional network structure | 2.0M | EC + EMC (1:1, vol) | 1.1 |
| Example 7 | Three-dimensional network structure | 2.0M | EC + EMC + DCM (2:1:1, vol) | 0.95 |

As shown in Table 4, compared to the hybrid capacitor of Comparative Example 2 in which a molar concentration of a lithium salt added as an electrolyte was 1.2 M, the hybrid capacitor of Example 1 in which a molar concentration of a lithium salt added as an electrolyte was 2.0 M had a high direct current internal resistance. However, it can be understood that the hybrid capacitors of Examples 4 to 7 had a reduced direct current internal resistance even when a lithium salt with a molar concentration of 2.0 M as in Example 1 was added as an electrolyte.

That is, it can be understood that, even if a molar concentration of a lithium salt added as an electrolyte increased, when the negative electrode active material was metal compound particles having high conductivity and a three-dimensional network structure, by using a mixture containing a cyclic carbonate ester and a chain carbonate ester as a solvent of the electrolytic solution, the direct current internal resistance was reduced.

In particular, when ethylene carbonate was selected as a cyclic carbonate ester and ethyl methyl carbonate was selected as a chain carbonate ester, a direct current internal resistance close to that of the case in which a lithium salt with a molar concentration of 1.2 M was used as an electrolyte was confirmed. In addition, it was confirmed that, when ethylene carbonate was selected as a cyclic carbonate ester, and a mixture of ethyl methyl carbonate and dimethyl carbonate was selected as a chain carbonate ester, an excellent direct current internal resistance was obtained as in the case in which a lithium salt with a molar concentration of 1.2 M was used as an electrolyte.

Figure 10:
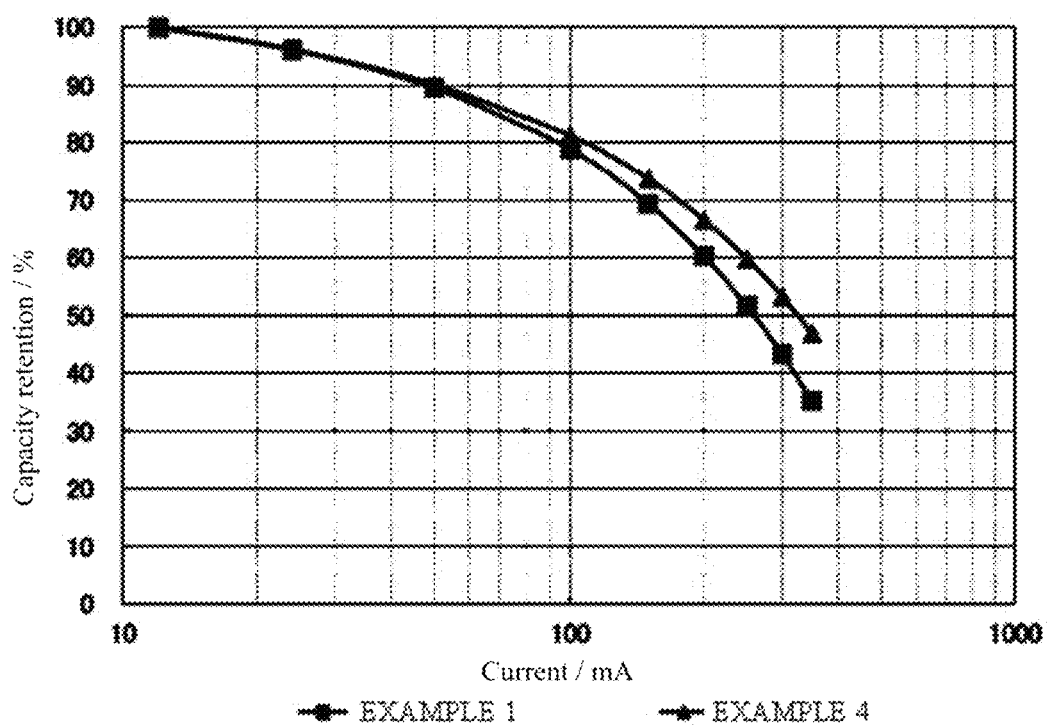
FIG. 10 is a graph showing discharging rate characteristics of hybrid capacitors of Examples 1 and 4.
Figure 11:
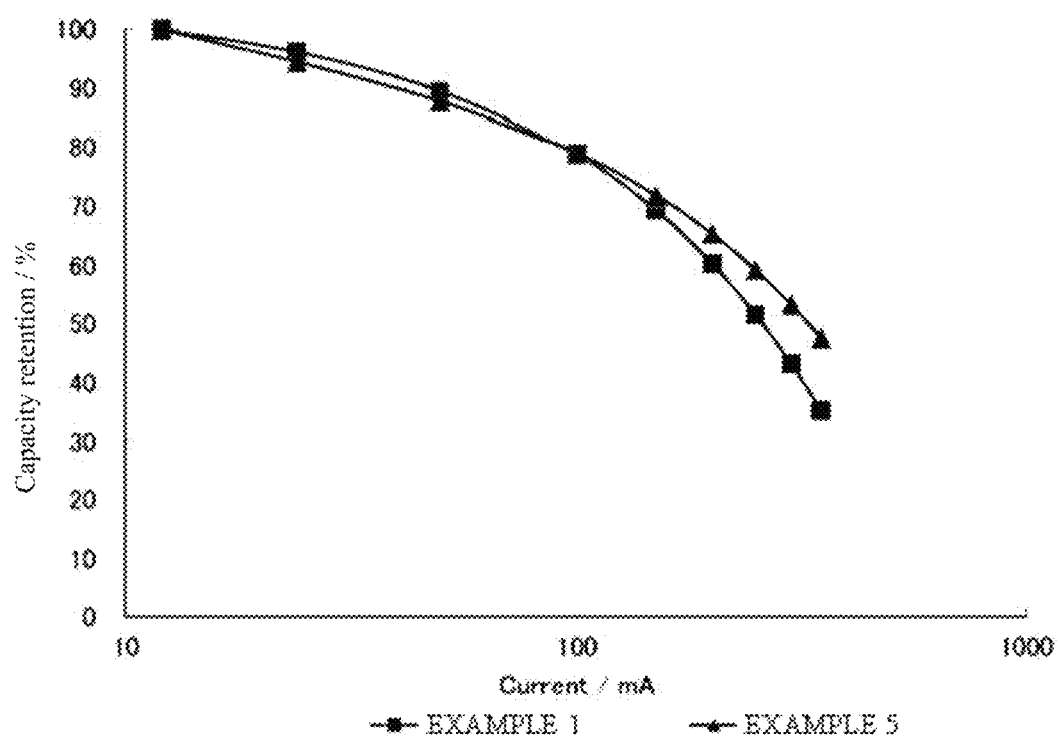
FIG. 11 is a graph showing discharging rate characteristics of hybrid capacitors of Examples 1 and 5.
Figure 12:
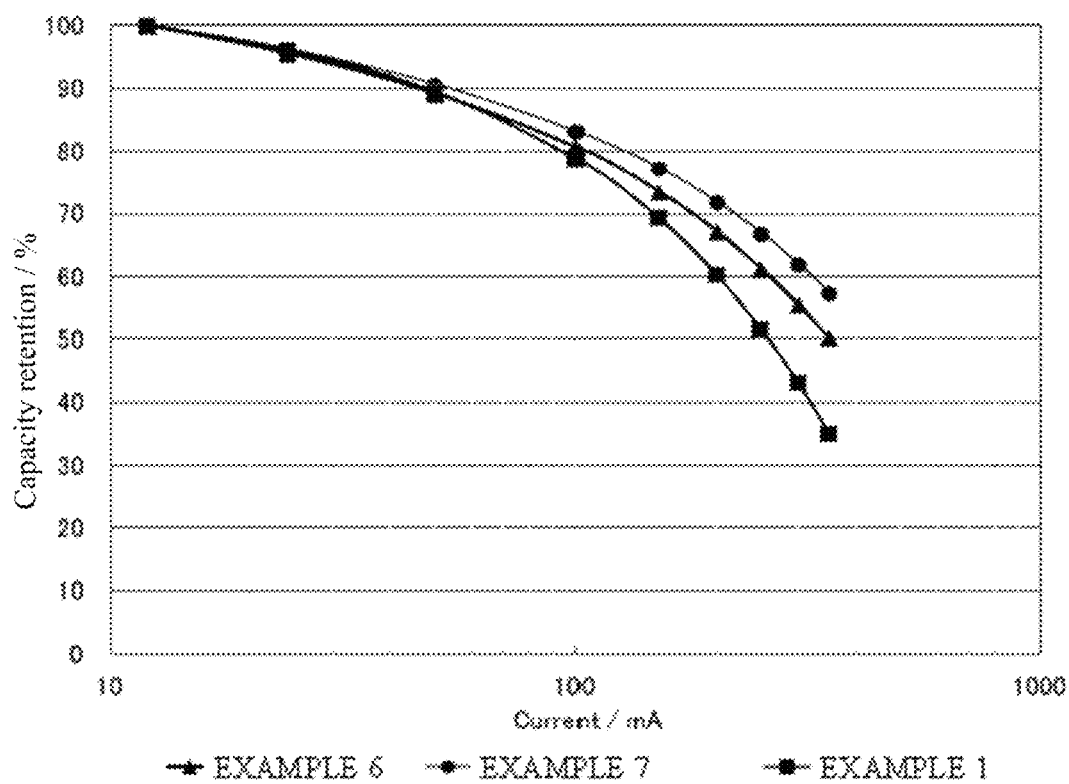
FIG. 12 is a graph showing discharging rate characteristics of hybrid capacitors of Examples 1, 6, and 7.

Subsequently, a test was performed to check discharging rate characteristics of Examples 4 to 7 in which the direct current internal resistance was improved in comparison with Example 1. In the graph of discharging rate characteristics shown in FIGS. 10 to 12, the horizontal axis represents a current and the vertical axis represents a percentage of a capacity with respect to each discharging current if a capacity when a hybrid capacitor was discharged at a discharging current of 12 mA was set as 100%. FIG. 10 shows discharging rate characteristics of the hybrid capacitors of Examples 1 and 4. FIG. 11 shows discharging rate characteristics of the hybrid capacitors of Examples 1 and 5. FIG. 12 shows discharging rate characteristics of the hybrid capacitors of Examples 1, 6, and 7.

As shown in FIGS. 10 and 12, in Examples 4, 6, and 7 in which ethylene carbonate was used as a cyclic carbonate ester and a chain carbonate ester was added, discharging rate characteristics were improved compared to Example 1, and particularly, favorable discharging rate characteristics were obtained. In addition, as shown in FIG. 11, in Example 5 in which propylene carbonate was used as a cyclic carbonate ester and a chain carbonate ester was added, compared to Example 1, it was confirmed that a capacity retention rate in a high discharging current region was high, and discharging rate characteristics in a high discharging current region were improved.

As described above, it was confirmed that, when a chain carbonate ester was added to a cyclic carbonate ester to form a solvent of the electrolytic solution, even if a lithium salt of an electrolyte had a high molar concentration, the direct current internal resistance was reduced, and cycle characteristics and discharging rate characteristics were improved, which was suitable for a hybrid capacitor including a negative electrode active material having a three-dimensional network structure.

The invention claimed is:

1. A hybrid capacitor comprising a capacitor element and an electrolytic solution that is impregnated into the capacitor element,
    the capacitor element comprises:
        a positive electrode including a polarizable electrode having an electrical double-layer capacitance; and
        a negative electrode having a layer of a negative electrode active material including metal compound particles which can occlude and release lithium ions and have a three-dimensional network structure including primary particles, voids, and pores,
    wherein the voids are defined by a mesh formed by a continuous connection of the primary particles and occupy 7-50% of a cross section of the three-dimensional network structure,
    wherein the pores have a size equal to or less than 40 nm between the primary particles, and in a differential pore volume converted from a pore distribution obtained by analyzing the metal compound particles using a nitrogen gas adsorption measurement method, the differential pore volume in a pore size range of 10 to 40 nm has a value of 0.01 cm$^3$/g or more, and
    wherein the electrolytic solution comprises a lithium salt with a molar concentration of 1.6 M or more as an electrolyte.

2. The hybrid capacitor according to claim 1,
    wherein the electrolytic solution comprises a mixture of a cyclic carbonate ester and a chain carbonate ester as a solvent.

3. The hybrid capacitor according to claim 2,
wherein the cyclic carbonate ester is propylene carbonate or ethylene carbonate, and
the chain carbonate ester is at least one type selected from the group consisting of ethyl methyl carbonate, dimethyl carbonate, and diethyl carbonate.

4. The hybrid capacitor according to claim 2,
wherein the cyclic carbonate ester is propylene carbonate or ethylene carbonate, and
the chain carbonate ester is a mixture of ethyl methyl carbonate and dimethyl carbonate.

5. The hybrid capacitor according to claim 2,
wherein the metal compound particles include less than 5 weight % of residual carbon with respect to the metal compound particles.

6. The hybrid capacitor according to claim 2,
wherein the metal compound particles are lithium titanate,
the metal compound particles have the three-dimensional network structure in which crystallites of the lithium titanate are connected to each other, and
a Magneli phase is formed on a part of the surfaces of the crystallites.

7. The hybrid capacitor according to claim 1,
wherein the metal compound particles include less than 5 weight % of residual carbon with respect to the metal compound particles.

8. The hybrid capacitor according to claim 1,
wherein the metal compound particles are lithium titanate.

9. The hybrid capacitor according to claim 8,
wherein the metal compound particles have the three-dimensional network structure in which crystallites of the lithium titanate are connected to each other, and
wherein a Magneli phase is formed on a part of the surfaces of the crystallites.

10. The hybrid capacitor according to claim 1,
wherein the electrolytic solution further comprises an ammonium salt as the electrolyte.

\* \* \* \* \*